United States Patent

Guyton et al.

[15] 3,695,552

[45] Oct. 3, 1972

[54] TAPE TRANSPORT ASSEMBLY FOR CASSETTE TAPE PLAYERS HAVING FAST FORWARD AND FAST REVERSE MODES

[72] Inventors: James H. Guyton; Arthur R. Lammers, both of Kokomo, Ind.

[73] Assignee: General Motors Corporation, Detroit, Mich.

[22] Filed: June 7, 1971

[21] Appl. No.: 150,571

[52] U.S. Cl. ..................................242/198, 274/4 E

[51] Int. Cl......G03b 1/04, G11b 15/32, G11b 23/04

[58] Field of Search..............................242/197–200; 274/4 C, 4 E, 4 F, 11 C; 179/100.2 Z

[56] References Cited

UNITED STATES PATENTS

| | | | |
|---|---|---|---|
| 3,429,519 | 2/1969 | Staar | 242/201 X |
| 3,603,595 | 9/1971 | Wada | 242/200 |
| 3,604,714 | 9/1971 | Staar | 274/4 E |

*Primary Examiner*—Leonard D. Christian
*Attorney*—E. W. Christen, C. R. Meland and Howard N. Conkey

[57] ABSTRACT

A tape transport assembly for cassette tape players having a capstan drive and also takeup and supply spindles for receiving a pair of tape carrying reels contained in a cassette cartridge wherein both the takeup and supply spindles are axially shiftable between forward and reverse drive positions. In the forward drive position, the takeup spindle drives one of the reels in a tape play direction during both a tape play mode and a fast forward mode. In the reverse drive position, the supply spindle drives the other reel in an opposite direction to effect a fast reverse mode. Forward and reverse drive sources rotate the spindles in opposite directions. A tape advance slide assembly is manually operable to initiate the fast forward mode by releasing the tape from engagement with the capstan drive. A tape reverse slide assembly is manually operable to initiate the fast reverse mode by concurrently shifting the spindles from the forward drive position to the reverse drive position, releasing the tape from the capstan drive, and activating the reverse drive source.

3 Claims, 9 Drawing Figures

INVENTORS
James H. Guyton, &
BY Arthur R. Lammers
R. Warren Smith
ATTORNEY

INVENTORS
James H. Guyton, &
BY Arthur R. Lammers
R. Warren Smith
ATTORNEY

INVENTORS
James H. Guyton, &
BY Arthur R. Lammers
R. Warren Smith
ATTORNEY

TAPE TRANSPORT ASSEMBLY FOR CASSETTE TAPE PLAYERS HAVING FAST FORWARD AND FAST REVERSE MODES

This invention relates to tape transport assemblies for tape players having fast forward and fast reverse modes for advancing and rewinding a tape carried between a pair of reels, and more particularly to a tape transport assembly for moving tape between supply and takeup reels carried in a cassette cartridge wherein the reels are driven in opposite directions in response to axial positioning of takeup and supply spindles to effect either the fast forward or the fast reverse modes.

In one general type of tape transport assemblies for cassette tape players, a capstan drive feeds a strip of tape carried in a cassette cartridge from one of a pair of reels to the other reel during a tape play mode. The reel receiving and winding the tape defines a takeup reel, and the other reel, from which the tape is unwound, defines a supply reel. These tape transport assemblies also usually include a tape advancing operation between the supply and takeup reels at a speed substantially higher than the tape playing speed. This aids in quickly positioning the tape for playing a desired portion of the tape. Rapid tape advance is commonly referred to as the fast forward mode. It is further typical to provide the assembly with a rewinding operation so that the tape is returned to the supply reel at a speed also substantially higher than the playing speed. The latter operation is commonly referred to as a fast reverse mode. Accordingly, it is desirable to simply and reliably effect the fast forward or fast reverse winding modes in a tape transport assembly by simple and reliable mechanism coupled to the tape driving parts of the assembly.

In accordance with the present invention, a tape transport assembly for cassette tape players adapted to receive a cassette cartridge having a pair of reels carrying a strip of tape includes a drive mechanism which includes a capstan drive and first and second spindle drive shafts slidably receiving takeup and supply spindles. Axial shifting of the takeup and supply spindles alternately establishes driving connections between the first and second spindle drive shafts and the pair of reels defining a takeup reel and a supply reel. The reel driving ends of the spindles are arranged so that in the normal and forward driving position the driving end of the takeup spindle engages the takeup reel for rotation in response to rotation of the first spindle drive shaft. The driving end of the supply spindle is axially offset so as to be in a disengaging relationship with the supply reel when in the forward drive position. In the reverse drive position, the driving end of the supply spindle engages the supply reel for rotation in response to rotation, in a reverse direction, of the second spindle drive shaft. The takeup reel is disconnected from the first spindle drive shaft by the driving end of the takeup spindle being positioned in a disengaging relationship relative to the takeup reel. The takeup and supply spindles are coupled together for simultaneous sliding movement between the forward and reverse driving positions to effect the alternate driving connections. A torque limiting clutch assembly couples the first spindle drive shaft to a forward drive source to control the winding of the tape onto the takeup reel during the tape play mode. The rotation of the first spindle drive shaft is controlled in response to the amount of tape received on the takeup reel. A tape advance slide assembly is manually operated so as to release the capstan drive from the tape. This enables the clutch assembly to drive the takeup spindle at a higher speed to wind the tape onto the takeup reel at an accelerated rate. This advances the tape in the fast forward mode. A reverse drive source is connected by the second spindle drive shaft to the supply spindle to effect opposite rotation from the rotation of the takeup spindle. A tape reverse slide assembly is manually operated to control the positioning of the spindles so that they are normally maintained in the forward drive position during both the tape play mode and the fast forward mode. Upon operation of the reverse slide assembly, the spindles are shifted to the reverse drive position. Concurrently, the tape reverse slide assembly effects release of the capstan drive from the tape and activates the reverse drive source. The supply reel is driven in a reverse direction to rewind the tape thereon at an accelerated rate. Upon release of the tape reverse slide assembly, the spindles are shifted back to the forward drive position and the capstan drive reengages the tape to return to the tape play mode.

A general feature of this invention is to provide an improved tape transport assembly for cassette tape players having capstan drive in which takeup and supply spindles are axially shiftable in a coacting relationship between forward and reverse drive positions for selectively driving a pair of cassette cartridge reels for winding and rewinding a strip of tape carried therebetween to effect either a tape play mode and a fast forward mode when in the forward drive position or a fast reverse mode when in the reverse drive position.

A further feature of this invention is to provide a tape transport assembly having a capstan drive for moving tape between a supply reel and a takeup reel of a cassette cartridge wherein the assembly includes a drive mechanism carrying first and second spindle drive shafts which slidably receive takeup and supply spindles for axially shifting movement between forward and reverse drive positions so as to alternately engage the takeup and supply reels to develop opposite driving rotation at the reels, and wherein the takeup and supply spindles are interlocked for simultaneous sliding movement so that upon one of the spindles engaging an associated reel the other spindle is maintained in a disengaging relationship with the other reel.

A still further feature of this invention is to provide a tape transport assembly for a cassette tape player having a compact and reliable drive mechanism including a capstan drive and takeup and supply spindles having driving ends defined by external spline sections and which are shiftable between forward drive and reverse drive positions so as to provide alternate engagement with internal splines of the takeup and supply reels carrying a strip of tape in a cassette cartridge, wherein a tape advance slide assembly is operable to release the capstan drive from the tape thereby releasing the tape tension developed by the capstan drive and condition a torque limiting clutch assembly for maximum driving rotation at the takeup spindle for developing a fast forward mode at the takeup reel, and further wherein a tape reverse slide assembly is operable to actuate a swinging bracket which controls shifting movement of the spindles between the forward and reverse driving positions and, concurrently, is operable to release the tape from a capstan drive and to activate a reverse drive source for developing a fast reverse mode at the supply reel.

These and other objects of this invention will be apparent from the following description of a preferred embodiment when considered in conjunction with the accompanying drawings.

Figures 1, 2:
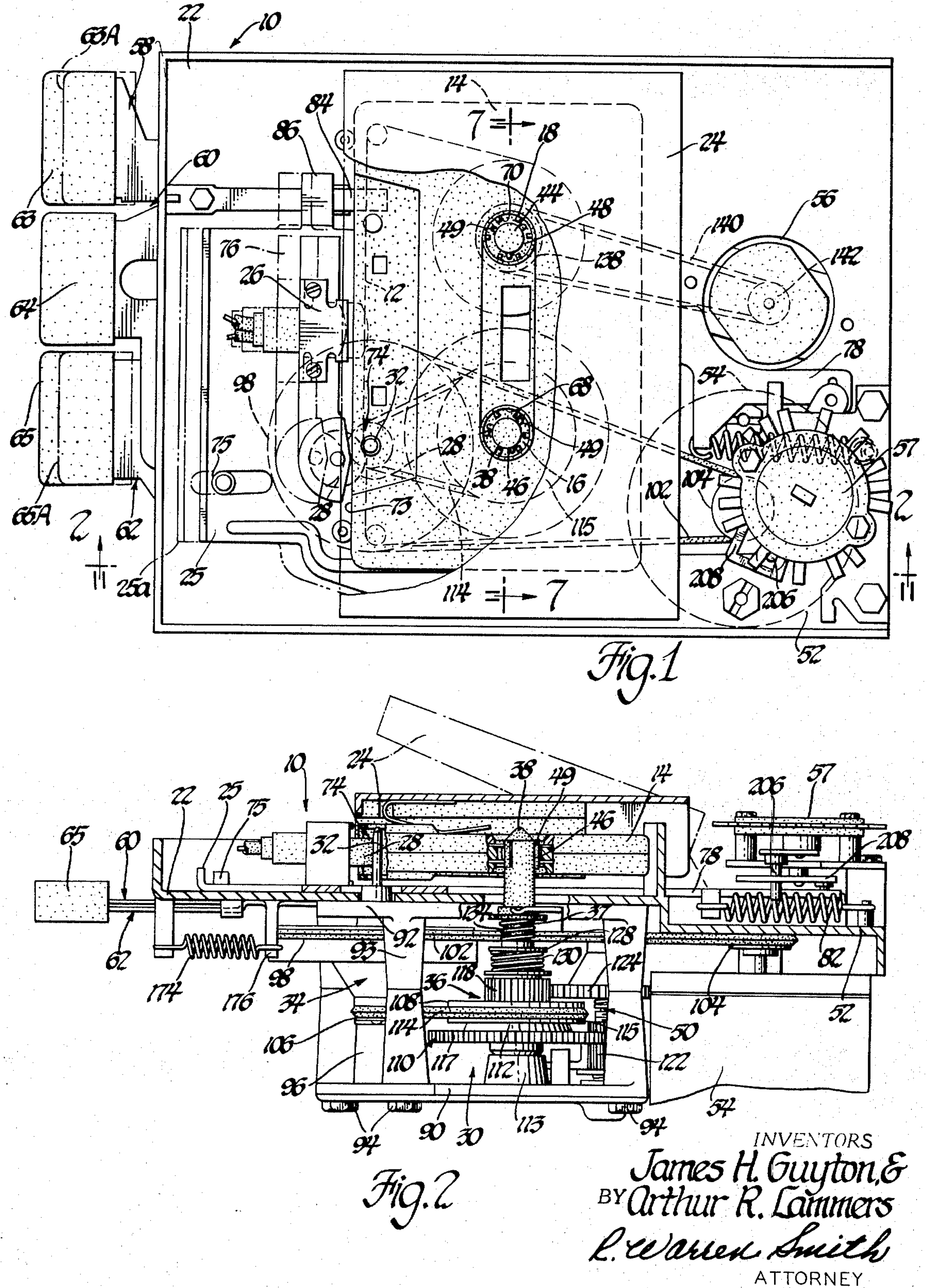
FIG. 1 is a top plan view with parts removed of a tape transport assembly for a cassette tape player made in accordance with the present invention.
FIG. 2 is a cross-sectional view taken along the axis 2—2 and looking in the direction of the arrows in FIG. 1.

Referring now to the drawings and more particularly to FIGS. 1 and 2, there is shown a tape transport assembly generally designated by numeral 10 for a tape player of the cassette type adapted to play a strip of magnetic recording tape 12 carried in a cassette tape cartridge 14. The cassette 14 is a twin hub cartridge of the coplanar type wherein the hubs define a pair of self-contained flangeless reels 16 and 18 rotatably mounted therein. The pair of reels 16 and 18 are referred to hereinafter as the takeup reel 16 and the supply reel 18, respectively, in accordance with movement of the tape 12 therebetween in which the tape 12 is wound and unwound in flat spiral convolutions at either reel.

The tape transport assembly 10 generally includes a chassis 22 illustrated in a horizontal position as it is normally mounted in a housing, not shown. The description of the parts of the assembly 10 is made with reference to this horizontal orientation. The top of the chassis 22 carries a cartridge receiving door 24 over a center section of the chassis 22 and a sliding platform 25 reciprocably movable on a forward section of the chassis 22. The sliding platform 25 supports a magnetic pickup transducer 26 and a pinch roller 28. A drive mechanism 30, for moving the tape 12 between the reels 16 and 18 is mounted to the bottom surface of the chassis 22 below the center section, as more clearly illustrated in FIG. 2. The drive mechanism 30 includes a capstan 32 including an elongated shaft carrying a flywheel assembly 34. A torque limiting clutch assembly 36 carries a first spindle drive shaft 37 slidably receiving a takeup spindle 38. The mechanism 30 further includes a second spindle drive shaft 42, shown in FIGS. 6, 7 and 8, slidably receiving a supply spindle 44. The shafts 37 and 42 are coaxially aligned with the axis of rotation of the reels 16 and 18, respectively. Reel driving ends 46 and 48 include external splines 49 on the ends of the spindles 38 and 44, respectively, and have a mutually axial offset relationship. The driving ends 46 and 48 and the upper end of the capstan 32 extend above the top of the chassis 22 and under the cartridge door 24. The drive mechanism 30 further includes a shut-off mechanism 50 that does not form a part of this invention and is described more fully in copending application Ser. No. 150,570, filed June 7, 1971, and assigned to the assignee of this invention.

In further accordance with the general description of the assembly 10, a rear section 52 of the chassis 22 is offset slightly below the forward and center sections as shown in FIGS. 1 and 2 to support a forward motor drive source 54, a reverse motor drive source 56 and a rotary on-off switch 57. Slide assemblies 58, 60 and 62 extend below the bottom surface of the chassis 22 and outward from the forward end of the chassis 22 to carry three push buttons 63, 64 and 65, respectively. The tape reverse slide assembly 58, the tape release slide assembly 60 and the tape advance slide assembly 62 are supported for parallel sliding movement with the other slide assemblies upon rearwardly and depressing operation of the associated push button. The tape reverse and tape advance slide assemblies 58 and 62 are operative, when the associated push buttons are depressed to the positions illustrated in phantom lines at 63A and 65A, to control the fast reverse and the fast forward modes, respectively. This rewinds and advances the tape 12 in accordance with this invention as described in detail hereinbelow. The tape release slide assembly 60 is operative to terminate the tape play mode for the tape 12 as also described hereinbelow.

With the cassette 14 mounted in the cartridge door 24 and in the play position when the door is closed, as illustrated in FIGS. 1 and 2, apertures in the cassette 14 expose internal splines 68 and 70 of the takeup and supply reels 16 and 18, respectively, which lay in a common horizontal plane so that the centers thereof coincide with the reel axis of rotation and are axially aligned with the takeup and supply spindles 38 and 44, respectively. The internal splines 68 and 70 slidably receive the radially extending sections of external splines 49. A further cassette aperture is located adjacent the front edge 73 of the cassette 14 for receiving the capstan 32 adjacent the rearward face of the tape 12.

The sliding platform 25 is movable on the chassis 22 between tape engaging and disengaging positions relative to the forward and operative face of the tape 12 exposed by windows in front edge 73 of the cassette 14. In the tape engaging position shown in FIGS. 1 and 2, the sliding platform 25 positions the pickup transducer 26 against the operative face of the tape 12 and clamps the pinch roller 28 against the tape 12 and the capstan 32. The pinch roller 28 and the capstan 32 with associated flywheel assembly 34 form a capstan drive 74 for moving the tape 12 in an operative relationship to the pickup transducer 26 and feeding the tape to the takeup reel 16 during the tape play mode.

Figure 3:
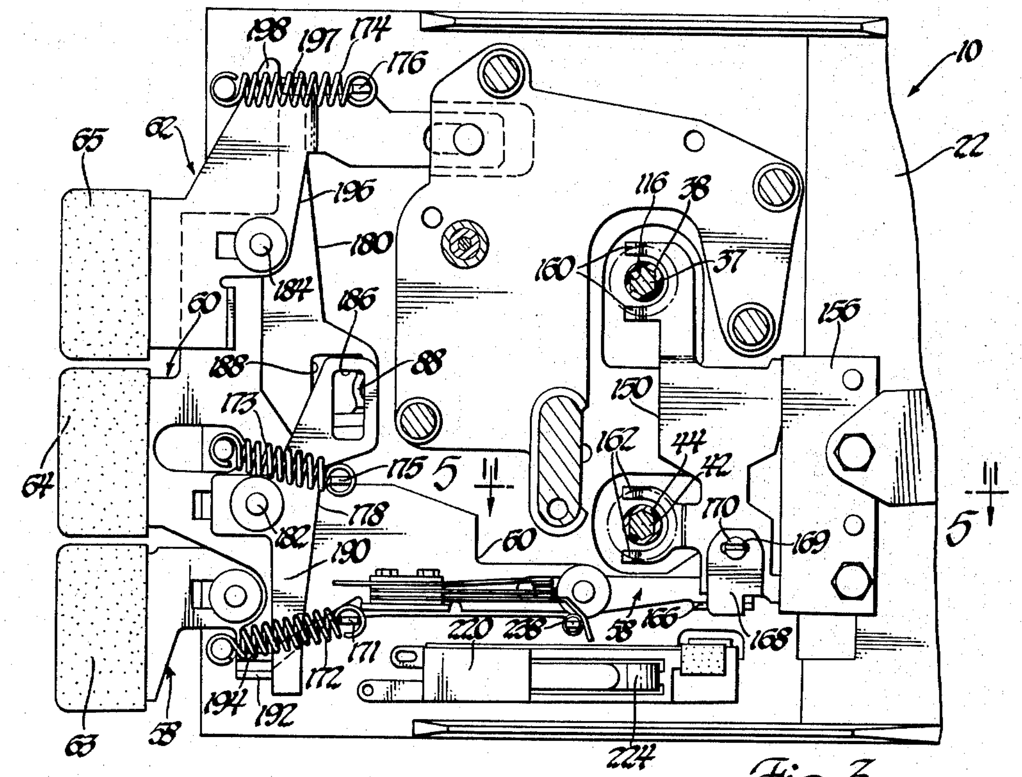
FIG. 3 is a bottom plan view partially in section, with parts removed, of the tape transport assembly shown in FIG. 1.
Figures 4, 5:
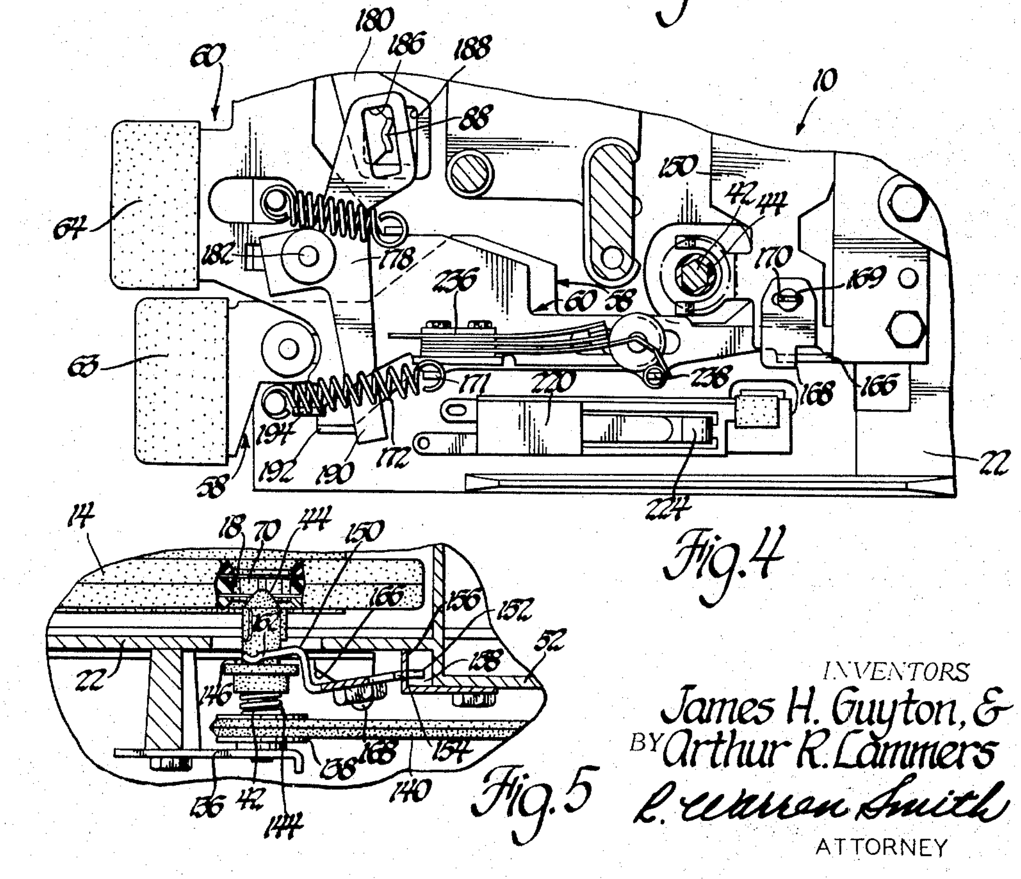
FIG. 4 is an enlarged fragmentary view of FIG. 3 showing the parts of the tape transport assembly in a different operative position.
FIG. 5 is a fragmentary cross-sectional view taken along the axis 5—5 and looking in the direction of the arrows in FIG. 3.

A guide pin and slot arrangement 75 controls the movement of the sliding platform 25 so that at the disengaging position the pickup transducer 26 and pinch roller 28 are remotely positioned from the cassette 14, as indicated by phantom lines 76 in FIG. 1. The sliding platform 25 extends rearwardly below the door 24, as shown in FIG. 2, to a rear end 78 terminating over the chassis rear section 52. A spring 82 is connected between the rear end 78 and the chassis 22 to bias the sliding platform 25 toward the engaging position. A leaf spring latch 84 is releasably engageable with a laterally projecting and vertically offset arm 86 of the sliding platform 25. The end of the latch 84 is depressed by the cassette 14, as shown in FIG. 1, when it is in the play position within the cartridge door 24 so that the spring 82 is operative to pull the sliding platform 25 from the disengaging position to the engaging position. A downward extending tab 88 of the sliding platform 25, illustrated in FIGS. 3 and 4, is actuated forwardly in response to rearward movement of each of the slide assemblies 58, 60 and 62, as described hereinbelow.

Referring now to the drive mechanism 30, a frame having a bottom support plate 90 and top support plate 92 are spaced apart by abutting legs 93 and are held together by bolts 94 to carry the drive mechanism parts. The lower shaft end of the capstan 32 is rotatably supported on a vertical boss 96 of the support plate 90 for carrying the flywheel assembly 34 for rotation about a vertical axis. A large diameter pulley 98 is formed by a groove in the periphery of the flywheel part of the flywheel assembly 34. A belt 102 connects the large pulley 98 to a pulley 104 carried on the shaft of the forward drive source 54. A further and smaller pulley 106 is carried adjacent the lower end of the flywheel assembly 34.

The torque limiting clutch assembly 36 is carried in the drive mechanism 30 adjacent the flywheel assembly 34 and includes a driving member 108 and a driven member 110 coupled together along a friction slipping clutch surface 112 formed therebetween. The operation of the clutch assembly 36 is described in detail in the aforementioned copending application Ser. No. 150,570. The driven member 110 is journaled for rotation on the support plate 90 by the lower end thereof resting in a rotatably bearing relationship on the vertical boss 113. The first spindle drive shaft 37 extends vertically from the center of the clutch surface 112 of the driven member 110 and terminates at an upper free end. The flywheel assembly pulley 106 receives a belt 114 connected to a pulley 115 of the clutch driving member 108.

The clutch driving member 108 is journaled for rotation on the lower end of the first spindle drive shaft 37. The upper free end of the first spindle drive shaft 37 has a noncircular cross section provided, for example, by hexagonal sides to slidably receive in a driving relationship a complementary shaped hexagonally sided closed bore 116 extending axially into the lower end of the takeup spindle 38. This mounts the takeup spindle 38 for rotation with the drive shaft 37. The gears 117 and 118 shown on the clutch driving and driven members 108 and 110, respectively, do not form a part of this invention and are mounted for engagement with parts of the shut-off mechanism 50 described in aforementioned copending application Ser. No. 150,570. The shut-off mechanism 50 generally provides a means for deactivating the forward drive source 54 when an end of tape condition is reached or by a bound condition of the tape 12

The clutch driven member 110 includes a radial flange 128 extending from the spindle drive shaft 37 for engagement by one end of a clutch coil spring 130 coaxially carried on the lower end of the spindle shaft 37. The opposite end of the clutch spring 130 engages the upper end of the clutch driving member 108. A desired axial compression is provided between the clutch driving and driven members 108 and 110 by the spring 130 at the clutch surface 112. With the takeup spindle 38 slidably mounted on the spindle drive shaft 37, the bottom of the spindle includes a radially outward annular shoulder 132 and an annular recess 133 concentric with the bore 116 for receiving a spindle coil spring 134 coaxially mounted on the spindle drive shaft 37. The flange 128 supports the lower end of the spindle spring 134 so as to develop a biasing force urging the takeup spindle 38 upward when it is compressed between the lower end of the takeup spindle 38 and the flange 128.

The mounting arrangement of the supply spindle 44 is shown in FIGS. 5 through 8. The second spindle drive shaft 42 is journaled on a pin extending vertically from a platform bracket 136 extending horizontally above the support plate 90 and below the bottom surface of the chassis 22. The bottom of the second spindle drive shaft 42 includes a pulley 138 receiving one end of a belt 140 having an opposite end received by a pulley 142 carried on the shaft of the reverse drive source 56 as shown in FIG. 1. The second spindle drive shaft 42 includes an upper free end having a noncircular cross section of the type provided on the upper end of the first spindle drive shaft 37. Hexagonal sides on the second spindle drive shaft 42 slidably receive complementary hexagonal sides of a closed bore 143 extending axially into the lower end of the supply spindle 44 in the same manner as in the takeup spindle 38. Since the second spindle drive shaft 42 slidably engages the complementary shaped bore sides of the supply spindle 44, they are rotationally coupled together while the supply spindle 44 is axially slidable thereon.

A spindle coil spring 144 corresponding to the spindle spring 134 is carried coaxially on the second spindle drive shaft 42 and between the upper side of the pulley 138 and the bottom of the supply spindle 44. A radially extending annular shoulder 146 is carried on the lower end of the supply spindle 44. In the forward drive position of the supply spindle 44 shown in FIGS. 5 and 7, the spindle spring 144 is compressed between the lower end of the supply spindle 44 and the pulley 138 to resiliently bias the supply spindle 44 upward.

Figures 6, 7, 8:
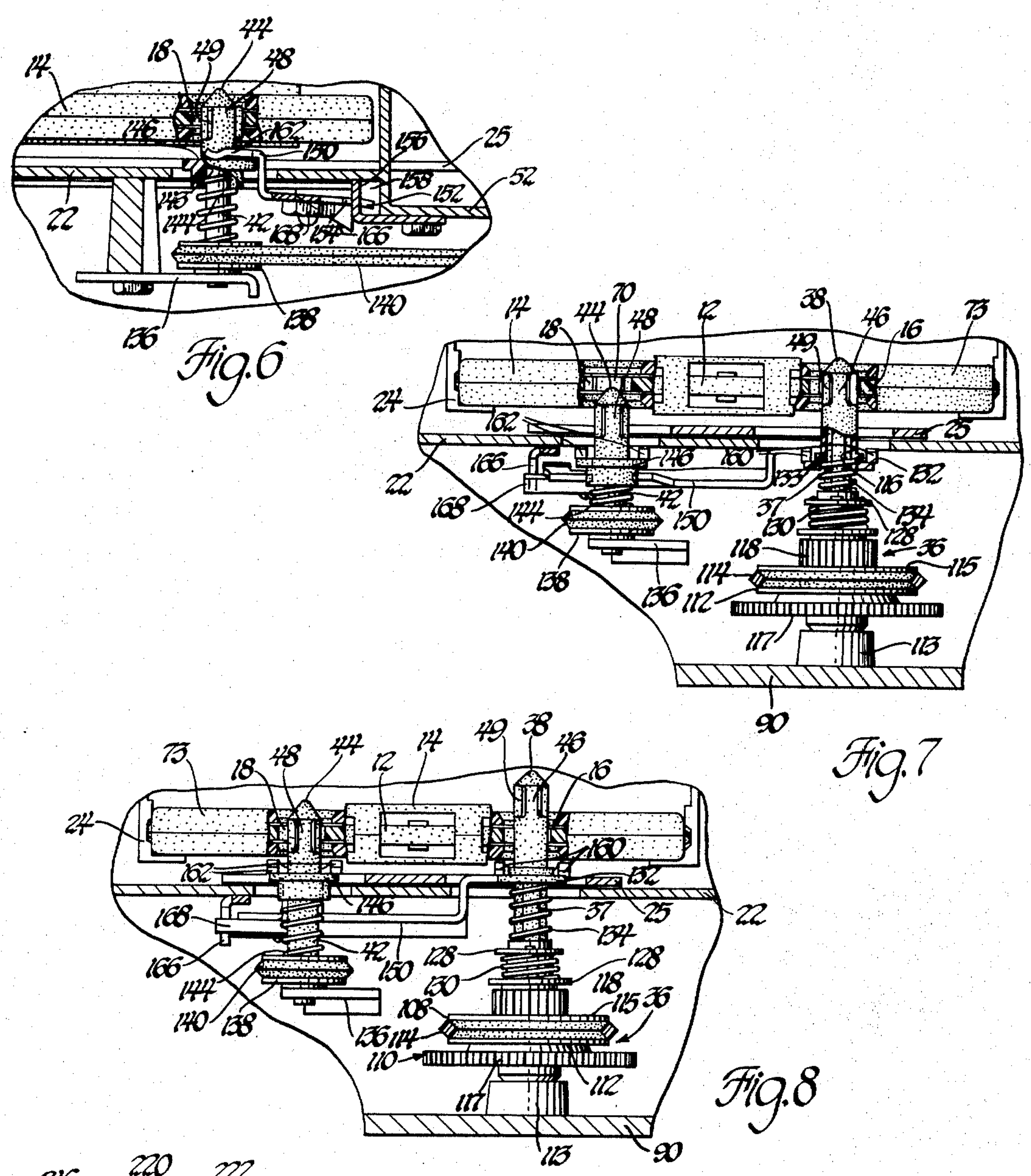
FIG. 6 is a fragmentary view corresponding to FIG. 5 with the parts having a different operative position.
FIG. 7 is a fragmentary cross-sectional view taken along the axis 7—7 and looking in the direction of the arrows in FIG. 1.
FIG. 8 is a fragmentary cross-sectional view corresponding to FIG. 7 with the parts having a different operative position.

As shown in FIGS. 7 and 8 the length of the takeup spindle 38 is slightly longer than the supply spindle 44 and the associated annular shoulders 132 and 146, respectively, are substantially horizontally aligned. The spindles 38 and 44 are shown in a forward drive position in FIG. 7, wherein a swinging bracket 150 is shown holding the spindles 38 and 44 in lowered positions on the pair of spindle drive shafts 37 and 42. In FIG. 8, the takeup and supply spindles 38 and 44 are shown in raised positions on the first and second spindle drive shafts 37 and 42 which corresponds to the reverse drive position.

As shown in FIG. 5, the rearward edge 152 of the swinging bracket 150 is shown in slots 154 receiving a vertical lip of an L-shaped chassis part 156. A hollow channel 158 is formed by the chassis part 156 which extends across the underside of the chassis 22 adjacent a vertical offset chassis surface defining the rear section 52. The bracket rearward edge 152 forms a fixed end connected in a hinged relationship to the chassis part 156 so that the swinging bracket 150 free end swings vertically about a horizontal axis perpendicular to both axes of reel rotation. The swinging bracket 150 free end includes two sets of spaced legs 160 and 162 defining a pair of yokes which rest on top of the annular shoulders 132 and 146 of the takeup and supply spindles 38 and 44. The biasing force developed by the pair of spindle springs 134 and 144 urges the yoke legs 160 and 162 upwardly via the annular shoulders 132 and 146. The takeup spindle 38 and the supply spindle 44 are interconnected by the swinging bracket 150 so as to be interlocked for simultaneously shifting movement.

The swinging bracket 150 is moved in response to the sliding movement of a vertically inclined cam surface 166, a bottom view being shown in FIGS. 3 and 4, a side view being shown in FIG. 5 and end views being shown in FIGS. 7 and 8. The cam surface 166 lengthens downwardly as it extends rearward from the end of the tape reverse slide assembly 58. A cam follower projection 168 is provided on the outer side of the swinging bracket 150 engaged by the cam surface 166. When the tape reverse slide assembly 58 is in a released condition, the longer part of the cam surface 166, as shown in FIGS. 5 and 7, forces the camming projection 168 downward so as to pivot the yoke legs 160 and 162 downward and lower the takeup and supply spindles 38 and 44 to compress the spindle springs 134 and 144. This establishes and holds the takeup and supply spindles 38 and 44 in the forward drive position.

When the tape reverse slide assembly 58 is operated by being depressed to a rearward position, the shorter part of the cam surface 166 permits the cam follower projection 168 to move upward thereon to an upper position, illustrated in FIG. 8. The spindle springs 134 and 144 resiliently bias the takeup and supply spindles 38 and 44 upward to the raised and reverse drive position. The spindle springs 134 and 144 are prevented from urging the spindles 38 and 44 further upward by the locking engagement afforded between the cam follower projection 168 and the cam surface 166. Accordingly, when the tape reverse slide assembly 58 is returned to the released condition, the longer part of the cam surface 166 forces the cam follower projection 168 downward against the force of the spindle springs 134 and 144 to pivot the yoke legs 160 and 162 downward and return the spindles 38 and 44 to the lowered and forward drive position. An elongated slot 169, shown in FIGS. 3 and 4, in the cam follower projection 168 receives a screw 170 for adjustable fastening of the projection 168 to the swinging bracket 150.

As shown in FIGS. 3 and 4, the tape reverse slide assembly 58 extends along the bottom surface of the chassis 22 and includes a downward extending tab 171. A return spring 172 is connected between the tab 171 and the chassis 22. The return spring 172 normally pulls the tape reverse slide assembly 58 to its forward and released position. Similar return springs 173 and 174 are connected at one end to the downward extending tabs 175 and 176 of the slide assemblies 60 and 62, respectively, and at the opposite ends to the chassis 22. Accordingly, when any of the push buttons 63, 64 or 65 are depressed, the return springs 172, 173 or 174 are elongated, as return spring 172 is shown in FIG. 4. Upon release of a push button, the associated slide assembly returns to the released condition shown in FIG. 3.

A pair of horizontal levers 178 and 180 are pivotally connected to the chassis 22 at center fulcrums pivoting about pins 182 and 184, respectively. Inwardly extending and overlapping arms of the levers 178 and 180 include rectangular apertures 186 and 188 both receiving the tab 88 of the sliding platform 25. An outwardly extending arm 190 of the lever 178 is positioned against rear sides of tabs 192 and 194 depending from the tape reverse and tape release slide assemblies 58 and 60, respectively. Actuation by rearward movement of either of the slide assemblies 58 or 60 pivots the arm 190 of the lever 178 so that the rearward edge of the aperture 186 drives the tab 88 forward to move the sliding platform 25 to the disengaging position. The outward extending arm 196 of the lever 180 includes a tab 197 which rests against a side extension 198 of the slide assembly 62. Similar to the operation of the slide assemblies 58 and 60, rearward movement of the tape advance slide assembly 62 pivots the lever 180 so that the rearward edge of the aperture 188 draws the tab 88 and moves the sliding platform 25 to the disengaging position.

The forward drive source 54 and the reverse drive source 56 include direct current motors carried by the chassis rear section 52 as noted hereinabove. The forward drive source 54 extends below the chassis 22 and the reverse drive source 56 extends above the chassis 22 so that the pulleys 104 and 142 connected to the motor shafts of these drive sources are aligned with the associated pulleys 98 and 138, respectively. The on-off switch 57 is also carried by the chassis rear section 52 and is operative to connect the tape player amplifying the detector circuits, not shown, to the pickup transducer 26 and is also operative to control the electrical circuits shown in FIG. 9 connected to the forward drive source 54 and the reverse drive source 56. An arcuately swinging switch arm 206, shown in FIGS. 1 and 2, is connected by a linkage 208 to the sliding platform rear end 78. The operation of the on-off switch 57 and of the electrical circuits for the forward and reverse drive sources 54 and 56 is more fully described hereinafter in connection with the description of FIG. 9.

Figure 9:
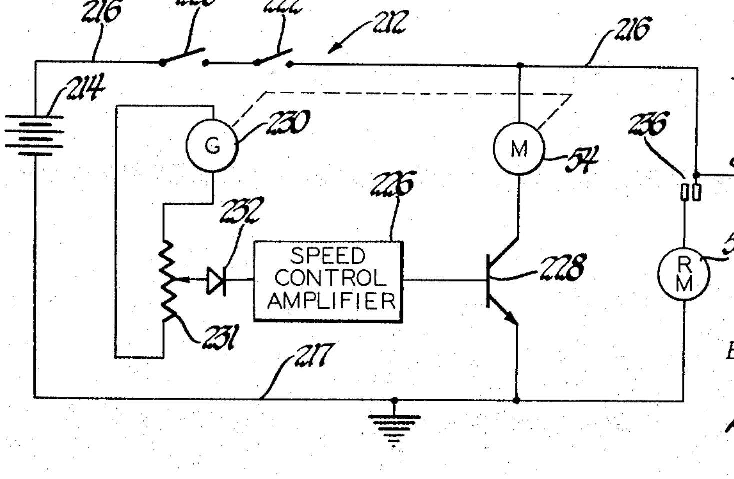
FIG. 9 is a schematic electrical diagram of a motor control circuit utilized in the tape transport assembly of this invention.

The electrical circuit diagram illustrated in FIG. 9 shows a circuit arrangement including a motor control circuit 212 for controlling the energization and activation of the forward drive source 54 and of the reverse drive source 56. A direct current electrical source 214, formed by a battery in one preferred embodiment, develops a nominal potential of 14 volts across the positive and negative poled conductors 216 and 217. Normally open contacts of a door interlock switch 220, illustrated in FIGS. 3 and 4, are connected in series with the conductor 216 as are contacts 222 included in the on-off switch 57. The door interlock switch 220 is closed when an upwardly extending tab, not shown, on the rearward portion of the switch leaf spring 224 is pressed downward upon closing of the cartridge door 24. The free end of the leaf spring 224 is mounted so as to open the contacts of the switch 220 when the cartridge door 24 is moved to the open position. Accordingly, closing of the cartridge door 24 depresses the free end of the leaf spring 224 so as to close the contacts of the door interlock switch 220.

As noted hereinabove, the cassette 14 depresses the leaf spring latch 84 so as to release the sliding platform 25 into the engaging position. The sliding platform 25 is prevented from sliding rearward by a means, not shown, until the cartridge door 24 is fully closed. Upon closing the cartridge door 24, the sliding platform 25 slides to the engaging position to move the pickup transducer 26 and pinch roller 28 into engagement with the magnetic tape 12 and actuate the switch arm 206 of the on-off switch 57. The contacts 222 are closed to operatively connect the motor control circuit 212 through the door interlock switch 220 to the electrical source 214.

An electronic speed control amplifier circuit 226 for controlling the speed of drive source 54 includes an output connected across the base to emitter circuit of an output transistor 228. A speed sensing feedback circuit arrangement includes a tachometer 230 mounted within the housing of the drive source 54 and connected to the shaft thereof. The output of the tachometer 230 develops a direct current sensing voltage corresponding to the shaft speed of the forward drive source 54 and this voltage is applied through a potentiometer 231 and diode 232 to the input of the amplifier circuit 226.

Accordingly, the speed of the forward drive source 54 is maintained constant by the amplifier circuit 226 by controlling the amount of current through the emitter-collector circuit of the output transistor 228 which connects the motor drive source 54 across the electrical power source 214.

The reverse drive source 56 is connected directly in series between the positive and negative conductors 216 and 217 by a reversing switch 236 having leaf spring contacts carried on the tape release slide assembly 60 as shown in FIGS. 3 and 4. The leaf spring contacts extend axially and parallel to the movement of the tape reverse slide assembly 58 which includes a tab 238. Rearward movement of the tab 238 urges leaf spring contacts together and electrically connects the reverse drive source 56 across the conductors 216 and 217. Accordingly, when the tape reverse slide assembly 62 is actuated, the reverse drive source 56 is energized by the electrical source 214 and is activated to develop rotation of the second spindle drive shaft 42. The supply spindle 38 is rotated to rewind the tape 12 onto the supply reel 18.

Referring now to the operation of a tape transport assembly 10 and assuming that the cassette 14 is in the playing position shown in FIGS. 1 and 2, to effect the tape play mode. The forward drive source 54 drives the flywheel assembly 34 and the capstan 32 at a speed in the order of 450 r.p.m., in a preferred embodiment, to transport the tape 12 at a speed of 1⅞ inches per second from the supply reel 18 and past the pickup transducer 26. Rotation of the flywheel assembly 34 rotates the clutch driving member 108 so that a predetermined rate of slipping at the clutch surface 112 develops sufficient torque on the driven member 110 and the takeup spindle 38 to receive the tape 12 fed by the capstan drive 74. As noted above, the takeup spindle 38 is in the forward drive position so that the external splines 49 of the driving end 46 are in meshing engagement with the internal splines 68 of the takeup reel 16 for rotation in a counterclockwise direction as viewed in FIG. 1. The rate of slipping occurring at the clutch surface 112 is in response to the tension developed in the tape 12 by the clamping engagement between the capstan 34 and the pinch roller 28 forming the capstan drive 74. The clutch surface 112 limits the torque applied to the drive shaft 37 and the takeup reel 16 so as to prevent the tape 12 from being pulled past the capstan drive 74. Typically, the speed of the takeup spindle 38 slows as the diameter of the tape 12 wound on the takeup reel 16 increases. In one preferred embodiment, the clutch driving member 108 rotates at a constant speed in the order of 155 r.p.m. while the maximum speed of the driven member 110 is in the order of 41 r.p.m. when winding commences onto the takeup reel 16 when initially empty.

For advancing the tape 12 quickly to a desired section of the tape 12 carried on the supply reel 18, the push button 65 is depressed to actuate the tape advance slide assembly 62. Concurrently, the sliding platform 25 is driven away from the tape 12 to the disengaging position to release the tape 12 from capstan drive 74. It is noted that the takeup and supply spindles 38 and 44 remain in the forward drive position since they are exclusively controlled by actuation of the tape reverse slide assembly 58. Therefore, the takeup spindle 38 drivingly couples the first spindle drive shaft 37 to the takeup reel 16 while the supply reel 18 is free of the supply reel 18.

The release of the capstan drive 74 from the tape 12 reduces the level of tension in the tape 12 and the level of opposing torque required for the takeup reel 16 to pull the tape 12 from the supply reel 18. In this condition, no slipping occurs at the clutch surface 112 and the clutch driving and driven members 108 and 110 are coupled together for common rotation. The drive source 54 continues to rotate at the same speed so that the clutch driven member 110 is driven at the speed, in the order of 155 r.p.m., of the driving member 108. This moves a strip of the tape 12 that has a 30 minute play capability, for example, during the tape play mode to be moved onto the takeup reel 16 in approximately 2 minutes. In this instance, the rate of tape movement during the fast forward mode is approximately three times the rate of movement during the tape play mode. The rate can be conveniently adjusted, if desired, by changing the speed of the forward drive source 54 during the fast forward mode.

When a desired recorded portion of the tape 12 is reached, the push button 65 of the tape advance slide assembly 62 is released so that the sliding platform 25 returns to the engaging position so that the capstan drive 74 again clamps the tape 12 to resume the tape play mode. This again increases the level of tension in the tape 12 between the capstan drive and the takeup reel 16 as the tape movement slows to the playing speed. The takeup spindle 38 slows due to the controlled rate of slipping provided at the clutch surface 112.

When it is desired to rewind the tape 12 from the takeup reel 16 to the supply reel 18, the push button 63 of the tape reverse slide assembly 58 is depressed. The tab 192 of the tape reverse slide assembly 58 is shifted rearward and, as when the tape advance control plate 62 is shifted, the sliding platform 25 is moved to release the capstan drive 74 from the tape 12. The repositioning of the cam surface 166 at the rear of the slide assembly 62 permits yoke legs 160 and 162 of the swinging bracket 150 to pivot upward and raise the takeup and supply spindles 38 and 44 under the influence of the spindle springs 134 and 144. This moves the spindles 38 and 44 to the reverse drive position to shift the driving end 46 of the spindle 38 out of engagement with the internal splines 68 of the takeup reel 16 and above the reel 16. This positions the lower part of the takeup spindle 38 adjacent the internal splines 68 so that it is freely rotatable within the takeup reel 16. The bottom of the section of external splines 49 of the spindle driving end 46 is spaced above the top of the section of external splines 49 on the spindle driving end 48 so that the takeup reel 16 is positively disengaged before the supply reel 16 is engaged. The forward drive source 54 continues to rotate the first spindle drive shaft 37, however, the takeup reel 16 is disconnected therefrom by the raised position of the takeup spindle 38.

The elevating movement of the swinging bracket 150 effects the meshing engagement of the supply spindle driving end 48 with the supply reel 18. Simultaneously, the reverse drive source 56 is activated upon the closure of the switch 236, in response to movement of the tape reverse slide assembly 58, as described hereinabove. This rotates the second spindle drive shaft 42 in a clockwise direction as viewed in FIG. 1 to drive the supply spindle 44 and the supply reel 18 to condition the assembly 10 for the fast reverse mode.

The tape 12 is pulled by the supply reel 18 during the fast reverse mode from the takeup reel 16 and wound onto the supply reel 18. If any portion of tape 12 intermediate the ends is desired to be played again, the push button 63 is released so that the sliding platform 25 returns toward the engaging position. This clamps the capstan drive 74 to the tape 12 again. The reverse drive source 56 is deactivated and the swinging bracket 150 is again pivoted downward to lower the takeup and supply spindles 38 and 44 to the forward drive position.

If the push button 63 is operated to continue to depress the tape reverse slide assembly 58, the tape 12 will become fully wound on the supply reel 18 when the tape end connected to the takeup reel 16 is reached. This stops further movement of the tape 14. Since the reverse drive source 56 is still activated, current continues to be applied to it so that a stalled condition is reached. The reverse drive source 56 is capable of sustaining a stalled condition for a sufficiently long period so as to not damage it. Also, the tension developed in the tape 12 by the supply spindle 44, in the latter condition, is not sufficient to break or pull it from the reel 16. The change in sound developed by ending the tape movement will alert the operator to release the push button 63 and the tape reverse slide assembly 58. The assembly 10 will immediately return to the tape play mode, as described hereinabove.

When it is desired to remove the cassette 14, the push button 64 of the tape release slide assembly 60 is depressed. As noted above, this retracts the sliding platform 25 to the disengaging position and opens the door 24 by a spring means, not shown. The tape transport assembly 10 is turned by opening of the switches 220 and 222 to disconnect the electrical source 214 from the motor control circuit 212. The takeup spindle 38 and supply spindle 44 remain in the forward drive position for return to the tape play mode when the cassette 14 is returned to the playing position by the cartridge door 24.

While a preferred embodiment is described hereinabove, it is understood that other forms may be adopted in accordance with this invention.

What is claimed is:

1. In a tape transport assembly for a cassette tape player having tape play and fast reverse modes of tape movement, the combination comprising: a chassis adapted to support a cassette tape cartridge at a play position, said cartridge being of the type containing a pair of hubs defining takeup and supply reels rotatable in a common plane and carrying a strip of tape for winding onto either of the reels in response to rotation of the reels in opposite directions; a capstan drive carried by said chassis, said capstan drive releasably engaging said tape when said cartridge is in said play position to condition said tape player for said tape play mode to effect movement of said tape from said supply reel to said takeup reel; a takeup spindle and a supply spindle aligned with the axis of rotation of said takeup reel and said supply reel, respectively, each of said spindles having an interior bore and being axially movable along said axis of rotation of a reel and through said common plane between a forward drive position and reverse drive position; a first spindle drive shaft and a second spindle drive shaft, each drive shaft being mounted at one end to said chassis for rotation about the axis of rotation of said takeup reel and said supply reel, respectively, and for an opposite direction of rotation relative to the other drive shaft, and each drive shaft being terminated at a free end directed toward the reels, said free ends of the first and second drive shafts slidably receiving said interior bores of said takeup and supply spindles, respectively, for movement between said forward and reverse drive positions; means responsive to said axial movement of said takeup spindle connecting said takeup spindle in a driving relationship between said takeup reel and said first drive shaft when said takeup spindle is in said forward drive position and disconnecting said last named driving relationship when said takeup spindle is in said reverse drive position; means responsive to said axial movement of said supply spindle connecting said supply spindle in a driving relationship between aid supply reel and said second drive shaft when said supply spindle is in said reverse drive position and disconnecting said last named driving relationship when said supply spindle is in said forward drive position; a swinging bracket member having a fixed end and a free end, said fixed end being pivotally connected to said chassis and said free end being movable between a first position and a second position about said fixed end, said free end including a pair of yoke parts connecting said takeup spindle and said supply spindle to said swinging bracket member and to each other so as to simultaneously position said spindles at said forward drive position and at said reverse drive position in response to said free end being positioned at said first and said second positions, respectively; a manually operable slide assembly carried by said chassis and movable between a released position and an actuated position; means connecting said slide assembly with said capstan drive so as to release said capstan drive from said tape when said slide assembly is in said actuated position, thereby removing said tape player from tape play condition; and means connecting said slide assembly to said swinging bracket member so that when in said released position said free end of said swinging bracket member is maintained in said first position and when in said actuated position said free end of said swinging bracket member is maintained at said second position, whereby movement of said slide assembly between said released and said actuated positions is effective to condition said tape player for said fast reverse mode.

2. In a tape transport assembly for a cassette tape player having tape play and fast reverse modes of tape movement, the combination comprising: a chassis adapted to support a cassette tape cartridge at a play position, said cartridge being of the type containing a pair of hubs defining takeup and supply reels rotatable in a common plane and carrying a strip of tape for winding onto either of the reels in response to rotation of the reels in opposite directions; a capstan drive carried by said chassis, said capstan drive releasably engaging said tape when said cartridge is in said play position to condition said tape player for said tape play mode to effect movement of said tape from said supply reel to said takeup reel; a takeup spindle and a supply spindle aligned with the axis of rotation of said takeup reel and said supply reel, respectively, each of said spindles having an interior bore and being axially movable along said axis of rotation of a reel and through said common plane between a forward drive position and reverse drive position, said supply spindle having a reel driving end alternately engaging and disengaging said supply reel when moved between the forward and reverse drive positions; a first spindle drive shaft and a second spindle drive shaft, each drive shaft being mounted at one end to said chassis for rotation about the axis of rotation of said takeup reel and said supply reel, respectively, and for an opposite direction of rotation relative to the other drive shaft, and each drive shaft being terminated at a free end directed toward the reels, said free ends of the first and second drive shafts slidably receiving said interior bores of said takeup and supply spindles, respectively, for movement between said forward and reverse drive positions; means responsive to said axial movement of said takeup spindle connecting said takeup spindle in a driving relationship between said takeup reel and said first drive shaft when said takeup spindle is in said forward drive position and disconnecting said last named driving relationship when said takeup spindle is in said reverse drive position; means coupling said supply spindle in driving relationship with said second drive shaft so that when said supply spindle is in said reverse drive position for positioning said reel driving end into engagement with said supply reel said second drive shaft is connected in driving relationship with said supply reel and when said supply spindle is in said forward drive position for positioning said reel driving end for disengagement with said supply reel said second drive shaft is disconnected from said last named driving relationship; a swinging bracket member having a fixed end and a free end, said fixed end being pivotally connected to said chassis along an axis perpendicular to both axes of rotation of said takeup reel and supply reel, said free end being movable between a first position and a second position about the connecting axis of said fixed end, said free end including a pair of yoke parts connecting said takeup spindle and said supply spindle to said swinging bracket member and to each other so as to simultaneously position said spindles at said forward drive position and at said reverse drive position in response to said free end being positioned at said first and said second positions, respectively; a reverse drive source coupled to said second drive shaft, said reverse drive source having an activated condition for rotating said second drive shaft and a deactivated condition terminating rotation of said second drive shaft; a manually operable slide assembly carried by said chassis and movable between a released position and actuated position; means connecting said slide assembly with said capstan drive so as to release said capstan drive from said tape when said slide assembly is in said actuated position, thereby removing said tape player from tape play condition; means responsive to movement of said slide assembly from said released position to said actuated position to render said reverse drive source operable in said activated condition; and means connecting said slide assembly to said swinging bracket member so that when in said released position said free end of said swinging bracket member is maintained in said first position and when in said actuated position said free end is maintained at said second position, whereby movement of said slide assembly between said released and said actuated positions is effective to condition said tape player for said fast reverse mode and said supply reel is driven to move said tape from said takeup reel to said supply reel.

3. In a tape transport assembly for a cassette tape player having tape play, fast forward and fast reverse modes of tape movement, the combination comprising: a chassis adapted to support a cassette tape cartridge at a play position, said cartridge being of the type containing a pair of hubs having internal splines and defining takeup and supply reels rotatable in a common plane for carrying a strip of tape for winding onto either of the reels in response to rotation of the reels in opposite directions; a capstan drive carried by said chassis, said capstan drive releasably engaging said tape when said cartridge is in said play position to condition said tape player for said tape play mode to effect movement of said tape from said supply reel to said takeup reel; a takeup spindle and a supply spindle axially movable along the axis of rotation of said takeup reel and said supply reel, respectively, between a forward drive position and a reverse drive position, each spindle having an interior bore and external splines complementary to said internal splines for driving engagement therewith, said external splines of said supply spindle being axially offset relative to said external splines of said takeup spindle to effect engagement between said takeup spindle and said takeup reel and disengagement between said supply spindle and said supply reel when in said forward drive position, and further to effect engagement between said supply spindle and said supply reel and disengagement between said takeup spindle and said takeup reel when in said reverse drive position; a first spindle drive shaft and a second spindle drive shaft, each drive shaft being mounted for rotation about the axis of rotation of said takeup reel and said supply reel, respectively, and being terminated at a free end directed toward the reels, said free ends of the first and second drive shafts slidably receiving in driving relationship said interior bores of said takeup and supply spindles, respectively, for movement between said forward and reverse drive positions, a torque limiting clutch including a driving member and a driven member, said driven member being connected to said first drive shaft; a forward drive source coupled to said driving member, said forward drive source being operable to rotate said driving member so that said torque limiting clutch limits the speed of said takeup spindle to below a predetermined speed when said clutch drive engages said tape during said tape play mode and develops a substantially higher speed than said predetermined speed at said takeup spindle when said clutch drive is released from said tape during said fast forward mode; a reverse drive source coupled to said second drive shaft, said drive source having an activated condition and a deactivated condition, said activated condition rotating said takeup spindle in a direction opposite to the direction of rotation of said takeup spindle when driven by said forward drive source; spring biasing means urging said takeup spindle and said supply spindle away from said forward drive position and toward said reverse drive position; a swinging bracket member having a fixed end and a free end, said fixed end being pivotally connected to said chassis and said free end being movable between a first position and a second position about said fixed end, said free end including a pair of yoke parts holding said takeup spindle and said supply spindle against said spring biasing means so as to simultaneously position said spindles at said forward drive position and at said reverse drive position in response to said free end being positioned at said first and said second positions, respectively; a first manually operable slide assembly and a second manually operable slide assembly, each slide assembly being carried by said chassis and movable between a released position and an actuated position; means responsive to movement of said first slide assembly from said released position to said actuated position to release said capstan drive from said tape to effect said fast forward mode and terminate said tape play mode; means connecting said second slide assembly with said capstan drive so as to release said capstan drive from said tape when said second slide assembly is in said actuated position, thereby terminating said tape play mode; and a cam means connected to said second slide assembly and engaging said swinging bracket member, said released position of said second slide assembly causing said cam means to maintain said free end of said swinging bracket member in said first position during said tape play mode and said fast forward mode, and said actuated position of said second slide assembly causing said cam means to release said free end of said swinging bracket member to said second position due to the bias of said spring biasing means; and means responsive to movement of said second slide assembly from said released position to said actuated position to render said reverse drive source from said deactivated condition to said activated condition, whereby said supply reel is driven to receive said tape from said takeup reel and effect said fast forward mode.

* * * * *